(12) United States Patent  
Yakovlev et al.

(10) Patent No.: US 7,203,813 B1  
(45) Date of Patent: Apr. 10, 2007

(54) METHODS, COMPUTER SYSTEMS, AND COMPUTER READABLE MEDIA FOR CHANGING MODULE POINTER VALUES UPON SWITCHES BETWEEN DIFFERENT MODES OF MEMORY ADDRESSING

(75) Inventors: Sergiy B. Yakovlev, Duluth, GA (US); Feliks Polyudov, Lilburn, GA (US)

(73) Assignee: American Megatrends, Inc., Norcross, GA (US)

( * ) Notice: Subject to any disclaimer, the term of this patent is extended or adjusted under 35 U.S.C. 154(b) by 476 days.

(21) Appl. No.: 10/720,458

(22) Filed: Nov. 24, 2003

(51) Int. Cl.  
*G06F 12/00* (2006.01)

(52) U.S. Cl. .................................................. 711/202

(58) Field of Classification Search ............ None  
See application file for complete search history.

(56) References Cited

U.S. PATENT DOCUMENTS

| | | | | |
|---|---|---|---|---|
| 5,043,870 | A * | 8/1991 | Ditzel et al. ............... | 711/132 |
| 5,355,490 | A * | 10/1994 | Kou .......................... | 713/100 |
| 6,272,613 | B1 * | 8/2001 | Bouraoui et al. ........... | 711/204 |
| 7,114,053 | B2 * | 9/2006 | Goss ......................... | 711/203 |
| 2004/0193832 | A1 * | 9/2004 | Garcia et al. ............... | 711/202 |
| 2004/0193833 | A1 * | 9/2004 | Hampton et al. ........... | 711/206 |
| 2005/0015378 | A1 * | 1/2005 | Gammel et al. ............ | 707/100 |
| 2005/0044338 | A1 * | 2/2005 | Goss ......................... | 711/203 |

* cited by examiner

*Primary Examiner*—Kevin Verbrugge  
(74) *Attorney, Agent, or Firm*—Hope Baldauff Hartman, LLC

(57) ABSTRACT

Methods, computer systems, and computer readable media maintain address values of a module stored in computer memory by changing the module pointer values upon switches between physical memory addressing and virtual memory addressing. Upon a function call to the module, the pointer values of the module are changed to correspond to the current mode of memory addressing. Thus, upon changing the pointer values to the current mode, the locations of the module can be properly accessed during execution of the module in the computer system.

27 Claims, 5 Drawing Sheets

METHODS, COMPUTER SYSTEMS, AND COMPUTER READABLE MEDIA FOR CHANGING MODULE POINTER VALUES UPON SWITCHES BETWEEN DIFFERENT MODES OF MEMORY ADDRESSING

TECHNICAL FIELD

The present invention is related to the execution of modules stored in computer memory. More particularly, the present invention is related to the adaptation of pointer values stored in the module upon a switch between different modes of memory addressing of the computer.

BACKGROUND

Computers have executable program modules stored in memory that may be executed by a processor of the computer. To properly execute the module, the processor must be able to properly locate information stored within the module when the module itself is stored in the memory of the computer system. The module provides pointer values that may be accessed by the processor to then find locations of information within the module being executed.

The computer system accesses memory according to a particular memory addressing mode. Various memory addressing modes may be used. For example, for multiple processor systems, one processor has its own address space while another processor has a different set of address space such that the address of a memory location is processor specific. Thus, the particular memory addressing mode depends upon the particular processor that owns the memory location.

Other examples of memory addressing schemes include a virtual mode of memory addressing and a physical mode of memory addressing. The physical mode of memory addressing utilizes the physical address of memory of the computer system without any remapping of the physical address space. The virtual mode of memory addressing applies a remapping scheme of the physical address space. This remapping scheme for virtual mode addressing allows for various desirable characteristics, such as to allow a virtual memory address to remain the same while the underlying physical addresses being used may change over time and/or to cause multiple memory devices to appear as a single address space or to cause a single memory device to appear as multiple address spaces.

However, because there is a remapping scheme being applied, the virtual memory mode pointer value for a location of particular data is different than the actual underlying physical pointer value where the data is stored. Thus, when the processor accesses memory in the virtual memory addressing mode, the actual location that is accessed is based on the remapping scheme. When the processor accesses memory in the physical mode, there is no remapping scheme involved.

Regardless of the particular example of where multiple memory addressing modes are in use, the memory location pointers of a module that a processor references to access information must be representative of the proper memory addressing mode or the processor will attempt to access a non-existent memory location.

As an example of having incorrect pointer values in the module, if the processor is currently in a first memory addressing mode but the pointer values of the module are representative of a second memory addressing mode, then the processor will read the second memory addressing mode pointer values of the module and apply them to the address space of the first memory addressing mode without a remapping scheme being applied. These second memory addressing mode pointers will direct the processor to an invalid location in memory and will result in a system failure.

The processor may be switched between a first mode of memory addressing and a second mode memory of addressing for various reasons. For example, when the operating system is controlling the memory accesses, the processor will likely be using virtual mode addressing discussed above. However, the hardware system may require a switch to the physical addressing mode, also discussed above. For instance, various hardware errors may require that the processor switch to the physical mode of addressing. However, the module in memory has pointer values representative of the virtual mode address space such that this module cannot be successfully executed once the switch to the physical mode of addressing has occurred.

SUMMARY

Embodiments of the present invention address these issues and others by providing methods, computer systems, and computer readable media that provide for adapting the pointer values of the module to be representative of the current mode of memory addressing. Thus, when the mode of memory addressing switches from one mode to the other, the pointer values of the module are changed to reflect the address space for the mode that is being employed after the switch has occurred.

One embodiment is a method of providing maintenance for pointer values in a module in computer memory during switches between a previous mode of memory addressing and a current mode of memory addressing. The method involves, after a switch from the previous mode of memory addressing to the current mode of memory addressing, receiving a function call to the module in memory. Upon receiving the function call to the module in memory, beginning execution of the module to convert the pointer values of the module from pointer values corresponding to the previous memory addressing mode to pointer values corresponding to the current memory addressing mode.

Another embodiment is a computer system for providing maintenance for pointer values in a module in memory of the computer system during switches between a previous mode of memory addressing and current mode of memory addressing. The computer system includes a memory containing the module and a processor configured to begin execution of the module at a known point of entry. The processor, upon receiving a function call to the module in memory, then begins execution of the module starting at the point of entry to convert the pointer values of the module from values corresponding to the previous memory addressing mode to values corresponding to the current memory addressing mode.

Another embodiment is a computer readable medium containing instructions of a module that when executed by a computer perform various steps to provide maintenance for pointer values in the module once it is stored in computer memory during switches between a previous mode of memory addressing and a current mode of memory addressing. The steps involve receiving a function call to the module in memory and then beginning execution of the module to convert the pointer values of the module from values corresponding to the previous memory addressing mode to values corresponding to the current memory addressing mode.

Another embodiment is a method of providing maintenance for pointer values in a module in computer memory during switches between a first mode of memory addressing and a second mode of memory addressing. The method involves receiving a first function call to the module in memory and upon receiving the function call to the module in memory, converting the pointer values of the module from pointer values corresponding to the first mode of memory addressing to pointer values corresponding to the second mode of memory addressing. After having received the first function call and having converted the pointer values, a second function call to the module in memory is received, and upon receiving the second function call to the module in memory, the pointer values of the module are converted from pointer values corresponding to the second mode of memory addressing to pointer values corresponding to the first mode of memory addressing.

DETAILED DESCRIPTION

Embodiments of the present invention allow for execution of a module in memory both before and after a switch from one memory addressing mode to another. The pointer values of the module that are used to access the information of the module are adapted to the current memory address mode when there is a function call to the module. Accordingly, the module in memory may be accessed both before and after a switch in the mode of memory addressing without causing a system failure that would otherwise result from accessing a non-existent, or otherwise incorrect location in memory.

Figure 1:
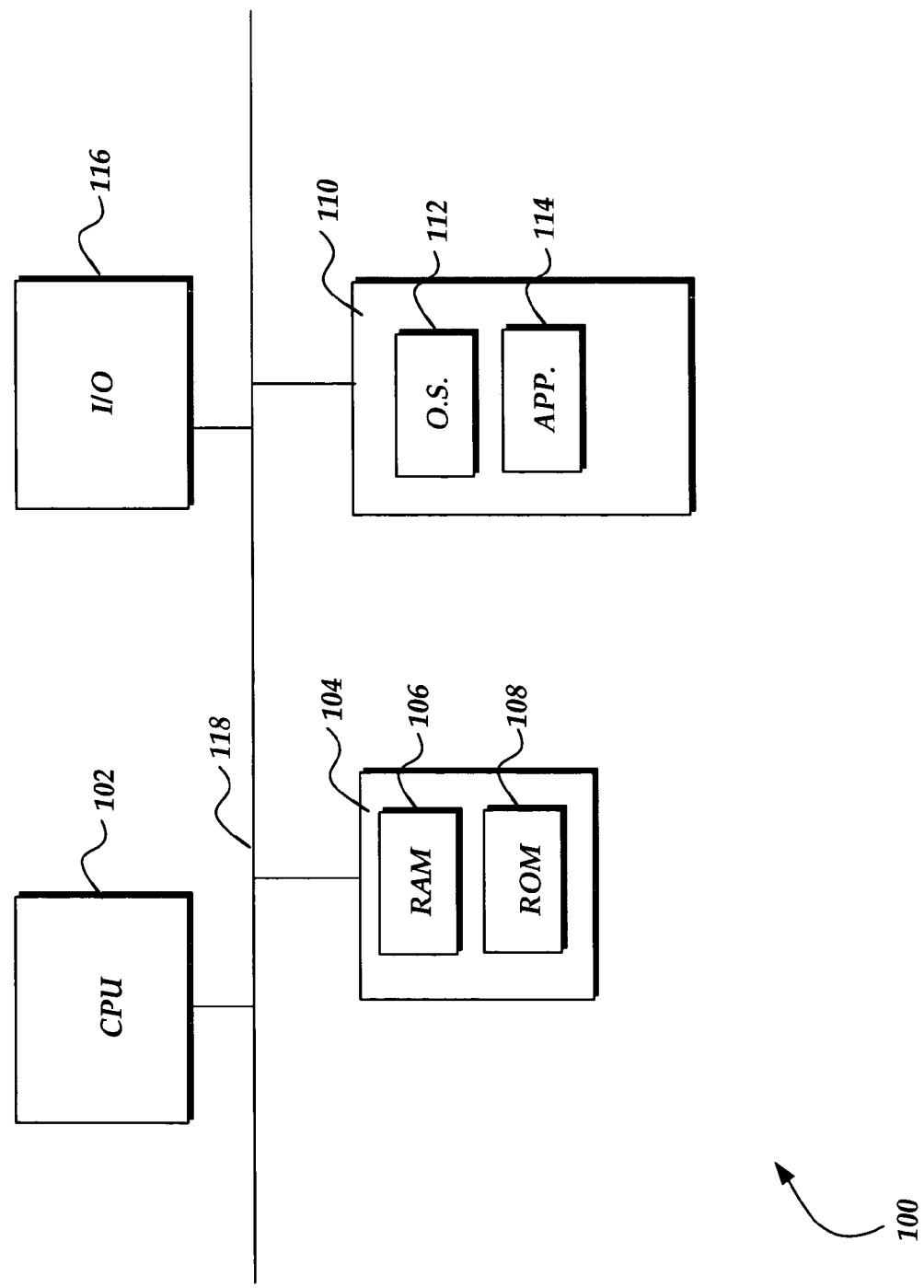
FIG. 1 shows a conventional computer architecture for implementing embodiments of the present invention.

FIG. 1 shows a typical computer system 100 that provides an operational environment for embodiments of the present invention. The computer architecture shown in FIG. 1 illustrates a conventional personal computer, including a central processing unit 102 ("CPU"), a system memory 104, including a random access memory 106 ("RAM") and a read-only memory ("ROM") 108, and a system bus 118 that couples the memory to the CPU 102. A BIOS containing the basic routines that help to transfer information between elements within the computer, such as during startup, is stored in the ROM 108. The personal computer 100 further includes a mass storage device 110 for storing an operating system 112 and application programs 114. The mass storage device 110 is connected to the CPU 102 through a mass storage controller (not shown) connected to the bus 118. The personal computer 100 may also include an input/output controller 116 for receiving and processing input from a number of devices, including a keyboard or mouse (not shown). Similarly, an input/output controller 116 may provide output to a display screen, a printer, or other type of output device.

The mass storage device 110 and its associated computer-readable media, provide non-volatile storage for the personal computer 100. Although the description of computer-readable media contained herein refers to a mass storage device, such as a hard disk or CD-ROM drive, it should be appreciated by those skilled in the art that computer-readable media can be any available media that can be accessed by the personal computer 100. By way of example, and not limitation, computer-readable media may comprise computer storage media and communication media.

Computer storage media include volatile and non-volatile, removable and non-removable media implemented in any method or technology for storage of information such as computer-readable instructions, data structures, program modules or other data. Computer storage media include, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above should also be included within the scope of computer-readable media. Computer-readable media may also be referred to as computer program product.

Figure 2:
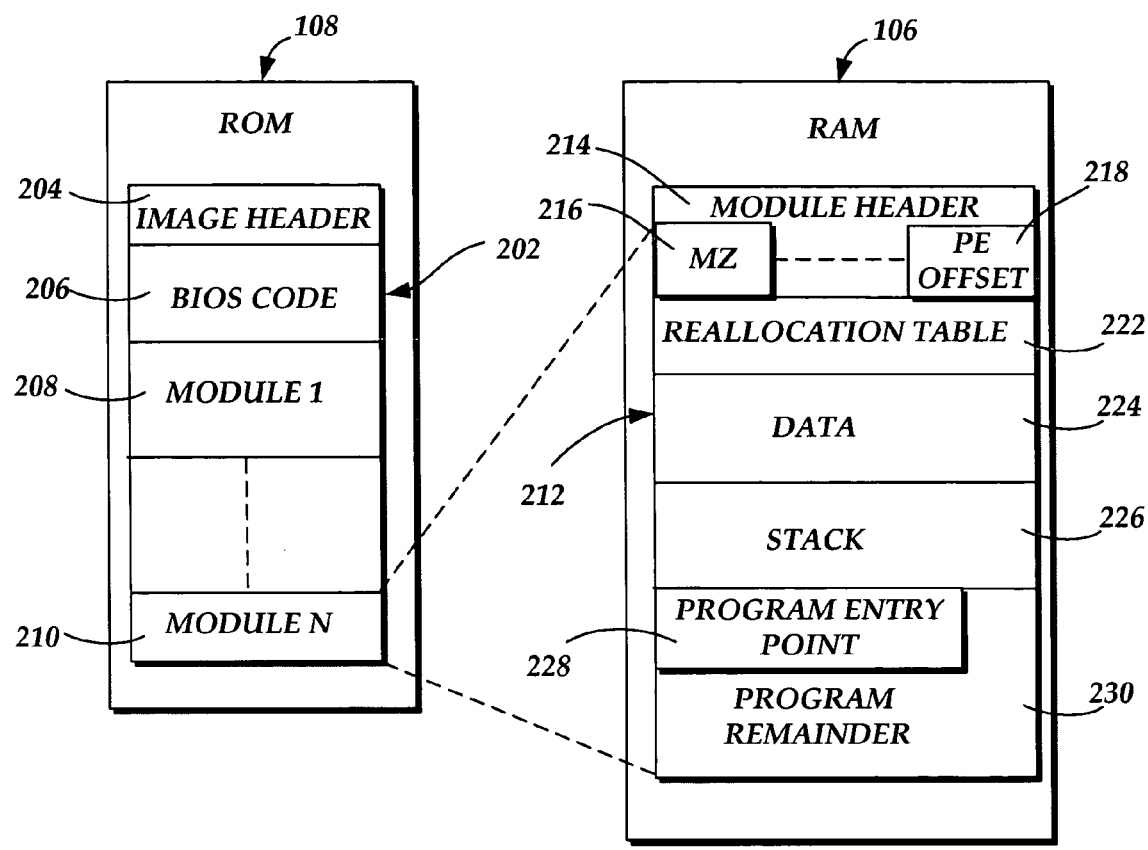
FIG. 2 shows a copy of a module from a ROM image of a ROM device to RAM of the computer system.

FIG. 2 shows the two components of the system memory, the ROM device 108 and the RAM device 106. The ROM device 108 includes a ROM image 202 that includes main BIOS code 206, a ROM image header 204, and various data modules 208, 210. Upon the computer starting to boot up, the BIOS code 206 being executed from the ROM device 108 by the processor 102 directs the processor 102 to make a complete copy of the ROM image 202 in RAM 106. The RAM image 106 of the ROM 108 includes a BIOS code copy, a BIOS header copy, and a copy of the various data modules. Once the ROM image is copied to RAM 106, the processor 102 continues to execute the remaining portions of the BIOS code copy and utilize the BIOS header copy and various data modules 208, 210 from RAM for increased speed of access.

During the copy to RAM, a portable executable ("PE") loader of the BIOS code 206 performs the copy. During the copying operation, the PE loader performs pointer value modification for the modules being copied because the pointer values in modules of the ROM image are only assumed pointer values made by the linker during compilation of the ROM image that are based on an assumed starting value for each of the modules. This starting value has an actual value once the module is in RAM, so the PE loader writes in the actual physical address starting value and then recalculates the proper pointer values based on the actual starting value and writes the new pointer values into the module. For a PE ROM image module, the starting value is located at offset 28 in the Optional header while it is stored in the Optional header at offset 24 for PE32+ ROM image modules. In a standard PE file, the Optional header can be found by finding the PE signature whose offset is specified at offset 60 from the beginning of the file module. The Optional PE header is located just after a File header that is located just after the PE signature.

As one example of a switch from a previous mode to a current mode, after the modules are copied to RAM and the proper physical address space pointer values are written into the modules, the computer system may transition to a virtual address space mode once the operating system loads. The operating system then notifies the BIOS core code 206 about the switch to virtual mode, and the BIOS core code 206 then converts the physical mode pointers to virtual mode pointers. At this point, the conventional ability to change the pointers ends such that upon a switch back to the physical mode, the module cannot be successfully called because there is no conventional mechanism to switch the pointers back to physical address mode pointers. However, embodiments of the present invention provide for logic within the modules to allow for subsequent conversion of pointer values due to subsequent changes from one mode of addressing to the next. Accordingly, such subsequent conversion of pointer values allows the modules to be successfully called after subsequent switches from one mode of memory addressing to another.

While various modules are transferred from ROM 108 and are unpacked when being stored in RAM 106, for purposes of illustration FIG. 2 shows an example of one module 212 being placed in RAM 106. The data module 212 has various portions that form a linked list in that pointer values stored in the module point to various locations of information within the module. In this example, the module 212 contains a main header portion 214 that contains a header signature portion 216 (e.g. MZ signature) and various offsets including a PE offset 218 indicating the location of the PE signature discussed above. The module 212 also includes a reallocation table 222 that maintains a set of offsets to the pointer values that point to the various locations of information including local variables and functions within the module 212.

The module 212 also includes program data 224, a program stack 226, as well as the program code 230. The program code 230 begins at a program entry point 228. This program entry point location is identified by a pointer stored by the BIOS core code 206 once copied to RAM 106, and this pointer is stored for both physical mode address space and virtual mode address space. The logic of the present invention may be located at the program point of entry 228, prior to the remainder of the program code 230 such that once a function call to the module 212 occurs, the logic of the present invention is executed prior to the remainder of the program code to ensure that the pointer values of the module correspond to the current mode of memory addressing.

Figure 3:
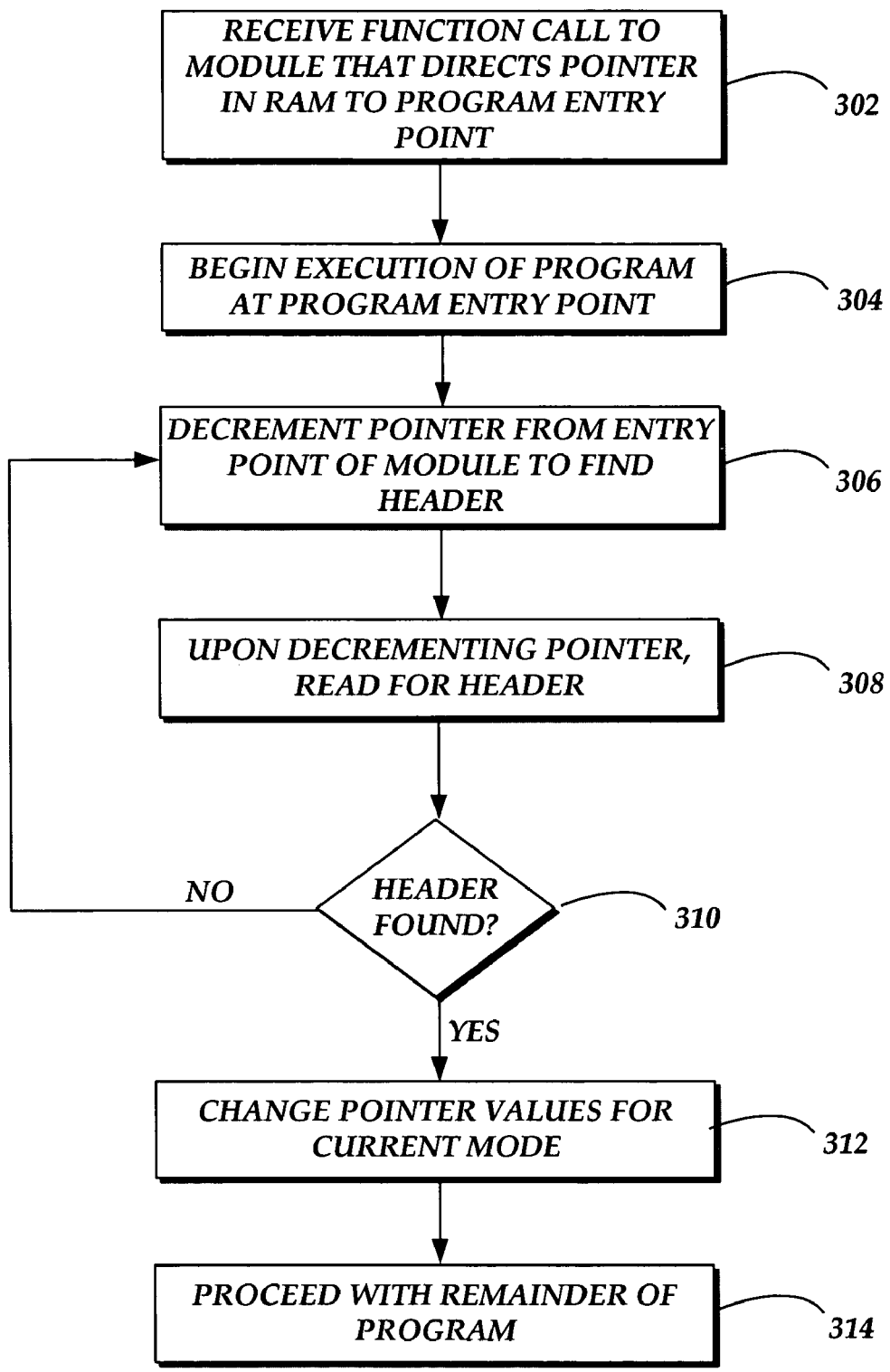
FIG. 3 shows the logical operations performed within the computer system for converting the pointer values from values corresponding to a previous mode of memory addressing to values corresponding to a current mode of memory addressing.

FIG. 3 illustrates the logical operations that are performed by an embodiment of the present invention to detect a change in the mode of memory addressing so that the pointer values of the module may be changed accordingly. The logical operations begin at function operation 302 where the module in RAM receives a function call which directs the BIOS core to reference the program point of entry for the module whose address the BIOS core has stored upon the module being initially loaded in RAM. The BIOS core checks to determine the current mode of memory addressing prior to accessing the module so that the proper pointer mode will be used to find the program point of entry. The bit to check is dependent upon the processor in use. For example, with the Itanium® processor family by Intel®, the bit is located at offset 17 of the status register. Once at the program point of entry, execution of the program begins at program operation 304. The beginning of execution of the program results in the remaining operations of FIG. 3 occurring.

Through execution of the program of the module, the pointer to the program point of entry of the module is decremented at decrement operation 306 by a set amount that is also dependent upon the particular processor to move from one boundary to a previous one. For example, the set amount to decrement is 8 bits for the Itanium® family of processors. Decrementing the pointer allows for searching of the main header for the module. Upon decrementing the pointer by the set amount, the module information at that location is read to determine if the main header is located at that position at read operation 308. Query operation 310 detects whether the main header has been found. Several pieces of information may be sought when reading from the module to find the main header, including the MZ signature, the PE signature, the machine type, and the image type.

If the main header has not been found for the module, then operational flow returns to decrement operation 306 where the pointer is again decremented to continue searching for the main header of the module. If the main header has been found, then operational flow proceeds to change operation 312 where the pointer values are changed to correspond to the current mode of memory addressing. One example of logical operations as represented by change operation 312 for changing the pointer values is shown in FIG. 4, while an alternative set of location operations as represented by changer operation 312 for changing the pointer values is shown in FIG. 5.

The logical operations of FIG. 3 assume that the current mode of memory addressing has changed from the mode being used on any previous attempt to access the module. Thus, these logical operations may be preformed upon each attempt to access the module, and then the operations of FIG. 4 or FIG. 5 will be implemented each time as well to convert the pointer values. If the mode has not changed since the previous access to the module, then there is no reason to convert the pointer values. One of ordinary skill will appreciate that rather than these logical operations of FIG. 3 making the assumption which may result in needless application of the conversion process, a value indicative of the previous mode may be stored at a known location and may be referred to each time there is an attempt to access the module. The previous mode may then be compared to the current mode that has been detected as noted above, and then the logical operations of FIG. 3 may proceed to decrement operation 306 only when the previous mode and the current mode differ. If they are the same, then there is no need to proceed with the logical operations of FIG. 3 as there is no need to convert the pointer values that are already in the proper mode.

Figure 4:
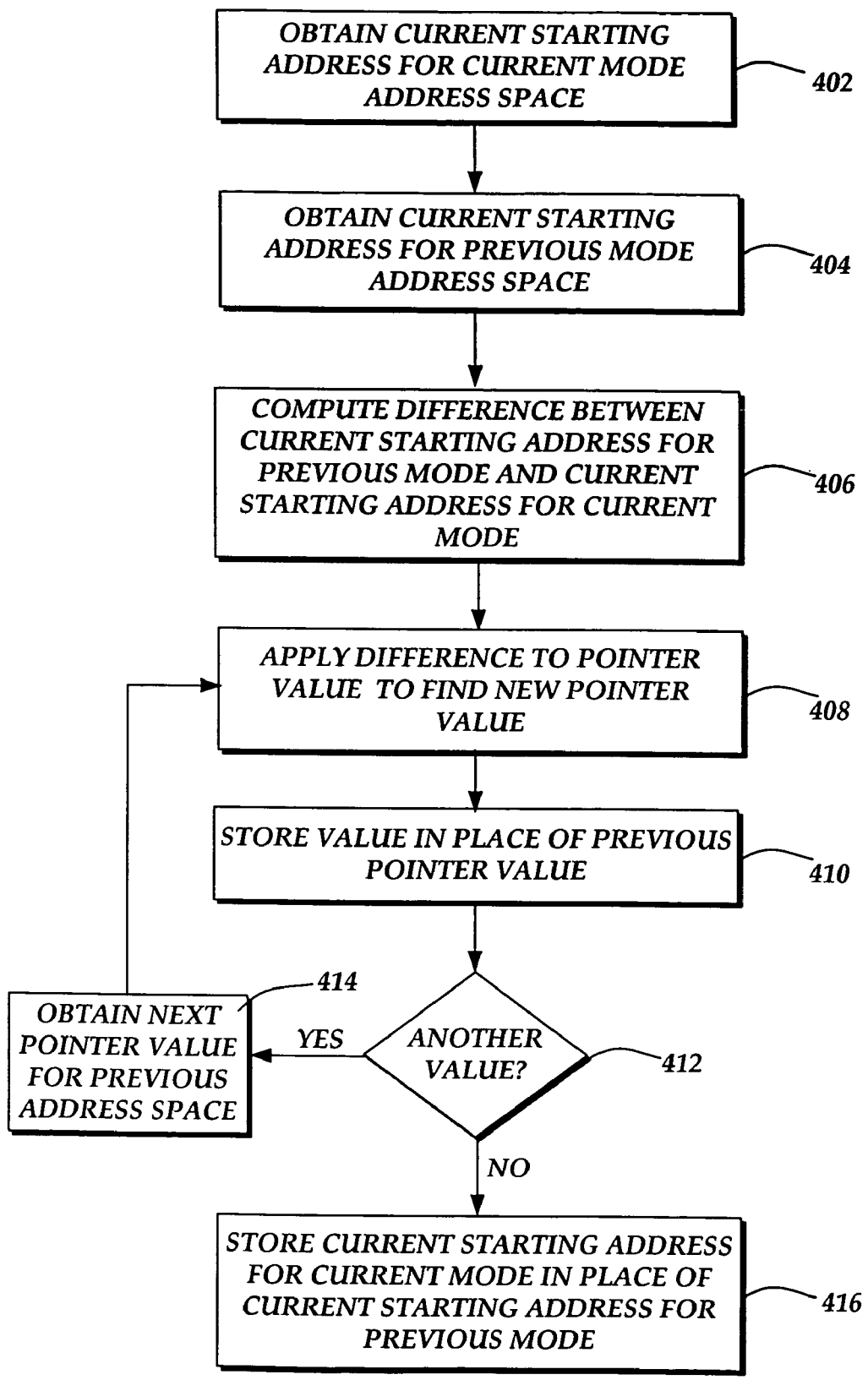
FIG. 4 shows the logical operations of one embodiment for performing the conversion of the pointer values of the module.
Figure 5:
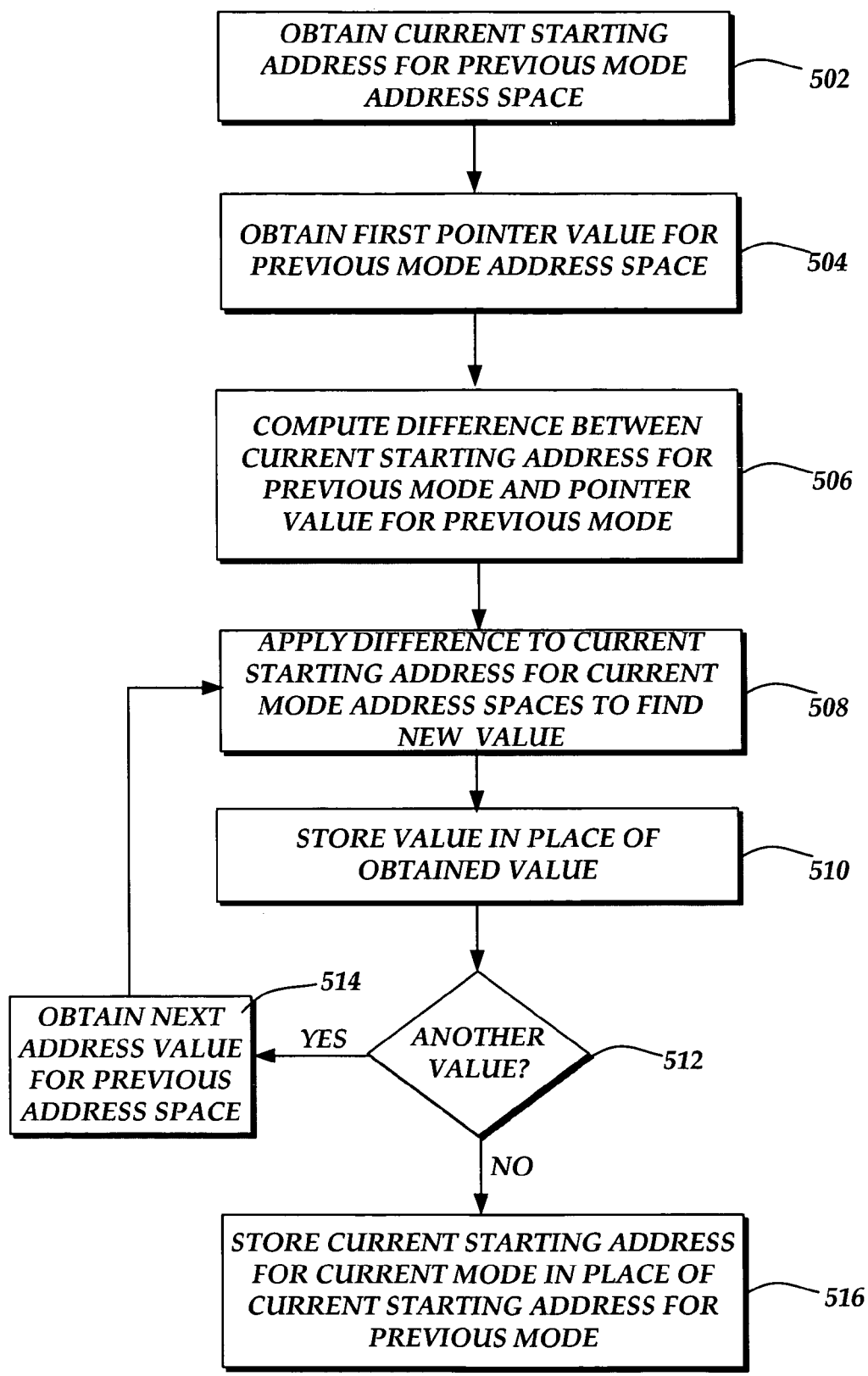
FIG. 5 shows an alternative set of logical operations of one embodiment for performing the conversion of the pointer values of the module.

The logical operations of FIG. 4 begin at address operation 402 where the starting address of the module for the current mode of memory addressing is obtained upon reaching the signature of the main header, through the operations of FIG. 3, which lies at the new starting address. At address operation 404, the starting address of the module for the previous mode of memory addressing (i.e., the mode last used when accessing module) is obtained by accessing it from the Optional header which is located within the module as discussed above. Upon finding both the new start address and the old start address, the difference between these two addresses is computed at computation operation 406.

Once the difference between the old start address for the previous mode of memory addressing and the new start address for the current mode of memory addressing is known, it can be applied to the pointer values referenced by the reallocation table. The difference is applied to a pointer value referenced by the reallocation table to find the new pointer value at table operation 408. The application of the difference value to the pointer value involves bit manipulations, adding the difference, and reverse bit manipulations. This process of applying the difference that has been found is well-known in the art, and is described in section 6.6 of the Microsoft® Portable Executable and Common Object File Format Specification, ver. 6.0, February 1999, by Microsoft Corporation. Upon finding the new pointer value, it is stored in place of the old pointer value referenced by the table at store operation 410. Query operation 412 then detects whether there is another pointer value that is referenced by the table to change.

If there are additional pointer values in the table, operational flow proceeds to pointer operation 414 where the next pointer referenced by the table is obtained. Operational flow then returns to table operation 408 where the difference is again applied to the old pointer value to find the new pointer value. Once query operation 412 detects that there are no other pointer values referenced by the reallocation table, operational flow proceeds to store operation 416 where the current starting address of the module for the current mode of memory addressing is stored in the Optional header in place of the old starting address. Thus, the next time the memory addressing mode changes, this value for the starting address will be in place to allow the pointer values referenced by the reallocation table to be changed once again to correspond to the new mode of memory addressing. While it has been described that the new starting address value is stored after all pointer values have been changed, it will be appreciated that the new starting address value can be stored in the Optional header in place of the old starting value at any time after address operation 404.

The logical operations of the alternative shown in FIG. 5 begin at address operation 502 where the old starting address is found as described above, by starting from the signature of the main header to proceed to the Optional header where the old starting address is stored. Upon accessing the old starting value, a pointer value is obtained from the offset specified in the reallocation table at pointer operation 504. A difference value is computed between the old starting value and the pointer value at computation operation 506.

After finding the difference between the old starting value and the pointer value, this difference is then applied to the new starting value at pointer operation 508 to find the new pointer value to replace the pointer value that was used to find the difference value. The new starting value is known from the logical operations of FIG. 3 finding the start of the module by searching for the main header signature. The new pointer value is then stored at the location referenced by the reallocation table in place of the old pointer value at store operation 510. Query operation 512 then detects whether there are additional pointer values in the table to be changed.

If there are additional pointer values referenced by the table to be changed, operational flow proceeds to pointer operation 514 where the next pointer referenced by the table is obtained. Operational flow then returns to computation operation 506 where the difference is again determined between the old pointer value just obtained and the old start value. Once query operation 512 detects that there are no other pointer values referenced by the reallocation table, operational flow proceeds to store operation 516 where the current starting address of the module for the current mode of memory addressing is stored in the Optional header in place of the old starting address to allow the pointer values referenced by the reallocation table to be changed once again should there be another change in the mode of memory addressing. Again, while it has been described that the new starting address value is stored after all pointer values have been changed, it will be appreciated that the new starting address value can be stored in the Optional header in place of the old starting value at any time after address operation 502 so long as the old starting value is maintained in some accessible location while the pointer values are being changed.

The logical operations of FIGS. 4 and 5 also assume that the current mode of memory addressing has changed from the mode used on any previous attempt to access the module. As noted above, this may be an accurate assumption as there may have been a check to determine whether the mode has changed before the logical operations of FIG. 4 or 5 are invoked. However, where the logical operations of FIG. 3 assume that the mode has changed rather than making such a determination, then the logical operations of FIG. 4 or 5 will be invoked upon every access of the module. One of ordinary skill will appreciate that rather than these logical operations of FIG. 4 or 5 being invoked to complete the conversion of pointer values, these logical operations may be modified so that if a difference of zero is detected at computation operation 406 or 506, then the logical operations may terminate as the pointer value is already in the proper mode.

Although the present invention has been described in connection with various illustrative embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method of providing maintenance for pointer values in a module in computer memory during switches between a virtual mode of memory addressing and a physical mode of memory addressing where the module contains programming to perform a conversion of pointer values, comprising:
   after a switch from the virtual mode of memory addressing to the physical mode of memory addressing, receiving a function call to the module in memory; and
   upon receiving a function call to the module in memory, beginning execution of the module to convert the pointer values of the module from pointer values corresponding to the virtual mode of memory addressing to pointer values corresponding to the physical mode of memory addressing.

2. The method of claim 1, wherein beginning execution of the module in memory to convert the pointer values comprises finding a header of the module to find a previous starting pointer value of the module as a basis for the conversion of the pointer values.

3. The method of claim 2, wherein finding a header value comprises beginning at a known point of entry for the module and decrementing a pointer value for the known point of entry until reaching the header of the module.

4. The method of claim 3, wherein finding the header of the module further comprises reading module information to find a header signature of the header.

5. The method of claim 2, wherein converting the pointer values of the module comprises computing pointer values for the physical addressing mode based on existing pointer values for the virtual mode, the previous starting pointer value of the module, and a current starting pointer value of the module for the physical memory addressing mode.

6. The method of claim 5, further comprising upon converting the pointer values of the module, changing the previous starting pointer value of the module to the current starting pointer value for the physical memory addressing mode.

7. The method of claim 6, further comprising:
again receiving a function call to the module in memory; and
again converting the pointer values of the module from pointer values corresponding to the virtual mode of memory addressing to pointer values corresponding to the physical mode of memory addressing based on existing memory location values for the virtual mode, the previous starting pointer value of the module, and a current starting pointer value of the module for the physical memory addressing mode.

8. A computer system for providing maintenance for pointer values in a module in memory of the computer system during switches between physical mode memory addressing and virtual mode memory addressing, comprising:
a memory containing the module; and
a processor configured to begin execution of the module at a known point of entry, the processor upon receiving a function call to the module in memory then beginning execution of the module starting at the point of entry to convert the pointer values of the module from pointer values corresponding to the virtual memory addressing mode to pointer values corresponding to the physical memory addressing mode.

9. The computer system of claim 8, wherein the processor executing the module in memory to convert the pointer values finds a header of the module to find a previous starting pointer value of the module as a basis for the conversion of the pointer values.

10. The computer system of claim 9, wherein the processor executing the module finds the header of the module by beginning at the known point of entry for the module and decrementing a pointer value for the known point of entry until reaching the header of the module.

11. The computer system of claim 10, wherein the processor executing the module finds the header of the module further by reading module information to find a header signature of the header.

12. The computer system of claim 10, wherein the processor executing the module converts the pointer values of the module by computing pointer values for the physical addressing mode based on existing pointer values for the virtual mode, the previous starting pointer value of the module, and a current starting pointer value of the module for the physical memory addressing mode.

13. The computer system of claim 12, wherein the processor executing the module, upon converting the pointer values of the module, changes the previous starting pointer value of the module to the current starting pointer value for the physical memory addressing mode.

14. The computer system of claim 13, wherein upon the processor again receiving a function call to the module in memory, again converting the pointer values of the module to pointer values corresponding to the physical memory addressing mode based on existing pointer values for the virtual mode, the previous starting pointer value of the module, and the current starting pointer value of the module for the physical memory addressing mode.

15. A computer storage medium containing instructions of a module that when executed by a computer perform the steps of:
providing maintenance for pointer values in the module once it is stored in computer memory during switches between a virtual mode of memory addressing and a physical mode of memory addressing by:
receiving a function call to the module in memory; and
upon receiving the function call, beginning execution of the module to convert the pointer values of the module from pointer values corresponding to the virtual mode of memory addressing to pointer values corresponding to the physical memory addressing mode.

16. The computer storage medium of claim 15, wherein beginning execution of the module in memory to convert the pointer values comprises finding a header of the module to find a previous starting pointer value of the module as a basis for the conversion of the pointer values.

17. The computer storage medium of claim 16, wherein finding the header of the module comprises beginning at a known point of entry for the module and decrementing a pointer value to the known point of entry until reaching the header of the module.

18. The computer storage medium of claim 17, wherein finding the header of the module further comprises reading module information to find a header signature of the header.

19. The computer storage medium of claim 16, wherein converting the pointer values of the module comprises computing pointer values for the physical addressing mode based on existing pointer values for the virtual mode, the previous starting pointer value of the module, and a current starting pointer value of the module for the physical memory addressing mode.

20. The computer storage medium of claim 19, wherein the steps performed upon execution of the instructions further comprise upon converting the pointer values of the module, changing the previous starting pointer value of the module to the current starting pointer value for the physical memory addressing mode.

21. The computer storage medium of claim 20, wherein the steps performed upon execution of the instructions further comprise:
again receiving a function call to the module in memory; and
again converting the pointer values of the module to pointer values corresponding to the physical memory addressing mode based on existing pointer values for the virtual mode, the previous starting pointer value of the module, and the current starting pointer value of the module for the physical memory addressing mode.

22. A method of providing maintenance for pointer values in a module in computer memory during switches between a first mode of memory addressing and a second mode of memory addressing, comprising:
receiving a first function call to the module in memory;
upon receiving the function call to the module in memory, converting the pointer values of the module from pointer values corresponding to the first mode of memory addressing to pointer values corresponding to the second mode of memory addressing;
after having received the first function call and having converted the pointer values, receiving a second function call to the module in memory; and upon receiving the second function call to the module in memory, converting the pointer values of the module from pointer values corresponding to the second mode of memory addressing to pointer values corresponding to the first mode of memory addressing.

23. The method of claim 22, wherein converting the pointer values of the module from pointer values corresponding to the first mode of memory addressing to pointer values corresponding to the second mode of memory addressing is based on existing memory location values for the first mode, a previous starting pointer value of the module, and a current starting pointer value of the module for the first memory addressing mode.

24. The method of claim 22, further comprising finding a header of the module by beginning at a known point of entry for the module and decrementing a pointer value for the known point of entry until reaching the header of the module.

25. The method of claim 24, wherein finding the header of the module further comprises reading module information to find a header signature of the header.

26. The method of claim 22, wherein converting the memory location values of the module comprises computing pointer values corresponding to the second mode of memory addressing to pointer values corresponding to the first mode of memory addressing is based on existing pointer values for the second memory addressing mode, a previous starting pointer value of the module, and a current starting pointer value of the module for the first memory addressing mode.

27. The method of claim 26, further comprising upon converting the pointer values of the module from pointer values corresponding to the second mode of memory addressing to pointer values corresponding to the first mode of memory addressing, changing the previous starting pointer value of the module to the current starting pointer value for the first memory addressing mode.

* * * * *